United States Patent [19]

Schafheutle et al.

[11] Patent Number: 5,334,690

[45] Date of Patent: Aug. 2, 1994

[54] POLYURETHANE DISPERSIONS

[75] Inventors: Markus A. Schafheutle, Hochheim; Heinz-Peter Klein, Mainz, both of Fed. Rep. of Germany

[73] Assignee: Hoechst Aktiengesellschaft, Fed. Rep. of Germany

[21] Appl. No.: 88,315

[22] Filed: Jul. 7, 1993

[30] Foreign Application Priority Data

Jul. 9, 1992 [DE] Fed. Rep. of Germany ........ 4222530

[51] Int. Cl.$^5$ .............................................. C08L 75/04
[52] U.S. Cl. ...................................................... 528/71
[58] Field of Search ........................................... 528/71

[56] References Cited

U.S. PATENT DOCUMENTS

| | | | |
|---|---|---|---|
| 4,108,814 | 8/1978 | Reiff et al. | 528/71 |
| 4,110,284 | 8/1978 | Violland et al. | 528/273 |
| 4,590,255 | 5/1986 | O'Connor et al. | 528/71 |
| 4,764,553 | 8/1988 | Mosback et al. | 528/71 |
| 4,908,743 | 5/1990 | Scriven et al. | 524/591 |
| 4,927,961 | 5/1990 | Fock et al. | 528/591 |
| 5,124,424 | 4/1992 | Endo et al. | 528/71 |
| 5,250,610 | 10/1993 | Hansel et al. | 528/71 |

FOREIGN PATENT DOCUMENTS

| | | |
|---|---|---|
| 0039162 | 11/1981 | European Pat. Off. . |
| 0262529 | 6/1988 | European Pat. Off. . |
| 3903804 | 8/1990 | Fed. Rep. of Germany . |
| 2247484 | 4/1975 | France . |
| 2286154 | 4/1976 | France . |

OTHER PUBLICATIONS

1570615–Germany translated yes–Search Report No. 93110600.9 Jul. 1969.

*Primary Examiner*—Maurice J. Welsh
*Attorney, Agent, or Firm*—Bierman and Muserlian

[57] ABSTRACT

Polyurethane dispersions, obtained by reacting an ionic polyester polyol, polycarbonate polyol or polyether polyol or mixture thereof with a polyisocyanate or mixtures of polyisocyanates. Such polyurethane dispersions, whose special feature is that the ionic groups are present in the polyol required for synthesizing the polyurethane molecule, are suitable in particular as binders for coatings, adhesives or printing inks.

8 Claims, No Drawings

POLYURETHANE DISPERSIONS

The invention relates to polyurethane dispersions which are obtained by reacting an ionic polyester polyol, polycarbonate polyol or polyether polyol or mixtures thereof with a polyisocyanate or mixtures of polyisocyanates. The term ionic polyesters, polycarbonates or polyethers is understood below as being compounds which contain COOH, —SO$_3$H and —PO$_3$H groups in their neutralized and unneutralized ("potentially ionic") form.

The polyurethane dispersions according to the invention are derived from ionic polyester polyols, polycarbonate polyols and/or polyether polyols. The ionic character which these polyols exhibit is based on the condensation of monomers which, in addition to the functional groups required for the condensation (for example hydroxyl, amino and carboxyl groups), contain sulfonic acid, carboxylic acid and/or phosphonic acid groups or sulfonate, carboxylate and/or phosphonate groups and which are referred to below as ionic monomers.

Ionic polyester polyols of this type are described in, inter alia, EP-A-0 364 331. They are obtained by reacting polycarboxylic acids and polyalcohols together with at least one ionic monomer, where this ionic monomer may be a diol, a dicarboxylic acid or a diamine which contains at least one sulfonic acid or sulfonate group.

Another suitable ionic monomer is a polyol or polyamine which contains a sulfonic acid, carboxylic acid, phosphonic acid, sulfonate, carboxylate or phosphonate group.

The preparation of the ionic polyester polyols is carried out by known methods in a one-stage or multistage process, depending on the esterification rate of the carboxylic acids. In a two-stage process, the carboxylic acids are first esterified with the components having functional hydroxyl groups in the presence of a catalyst and the ionic monomers are then introduced. However, it is also possible first to react the ionic monomers with the corresponding components having functional hydroxyl groups or functional carboxyl groups and then to condense the remaining nonionic monomers. If a polyester polyol prepared from lactones is used, the procedure is exactly the same as the above one.

For the ionic polyester polyols having sulfonic acid groups or phosphonic acid groups, it may be necessary, in order to achieve as quantitative a condensation of the sulfomonomer as possible, likewise to carry out the synthesis in a multistage process. For this purpose, the total components having functional hydroxyl groups are first reacted with the sulfomonomers or phosphonic acid monomers and, if required, with the aromatic, carboxylic acid-containing components in the presence of catalysts, so that the amount of distillate calculated for a quantitative conversion is obtained in the condensation. If necessary, the aliphatic carboxylic acid components are then reacted, the condensation being carried out up to an acid number of less than 10, preferably less than 4.

The preparation of the ionic polycarbonate polyols and of the polyether polyols can be effected according to two mechanisms. The ionic monomers can be introduced into the polycarbonate polyol or polyether polyol by transesterification or by condensation with simultaneous increase in the molecular weight.

To prepare the ionic polyether polyols and polycarbonate polyols, polyether polyols or polycarbonate polyols are reacted together with the ionic monomers which also contain a dicarboxylic acid function or a dicarboxylate function in addition to their ionic function, and the corresponding condensate is separated off by distillation. Here too, reaction is effected up to an acid number of less than 10, preferably less than 4.

In the case of dicarboxylates, the end point of the reaction is reached when the hydroxyl number corresponds to the calculated molecular weight.

The polycarbonates may additionally be reacted as follows with ionic monomers. The polycarbonate diols are reacted with diol-containing ionic monomers under transesterification conditions. The end point is reached when the resulting hydroxyl number corresponds to the desired molecular weight.

The polycondensation reaction takes place at temperatures between 120° and 230° C., preferably between 140° and 220° C. Suitable catalysts are preferably organometallic compounds, in particular zinc-, tin- or titanium-containing compounds, such as, for example, zinc acetate, dibutyltin oxide, tetrabutyl titanate, tetraisopropyl titanate or tetrakisethylhexyl titanate. The amount of catalyst is preferably 0.1 to 1.5% by weight of the total batch.

For the preparation of the ionic polyester polyols, it is possible to use aliphatic, cycloaliphatic, aromatic and/or heterocyclic polycarboxylic acids which, if required, are substituted by, for example, halogen atoms. The following may be mentioned as examples of such carboxylic acids and derivatives thereof: succinic acid, adipic acid, azelaic acid, sebacic acid, phthalic acid, terephthalic acid, isophthalic acid, trimellitic acid, pyromellitic acid, tetrahydrophthalic acid, hexahydrophthalic acid, di- and tetrachlorophthalic acid, endomethylenetetrahydrophthalic acid and its hexachloro derivative, glutaric acid, maleic acid, fumaric acid and dimeric and trimeric fatty acids.

Instead of these acids, it is also possible to use their anhydrides, if they exist, or their esters, for example the methyl or ethyl esters.

Preferably used polyalcohols are low molecular weight polyols, polyhydroxy polyethers, polylactone polyols and polycarbonate polyols. Suitable low molecular weight polyols are, for example, ethanediol, the various propane-, butane- and hexanediols, dimethylolcyclohexane, 2,2-bis(4-hydroxycyclohexyl)propane, diethylene glycol, triethylene glycol, glycerol, trimethylolethane or trimethylolpropane, hexanetriol, neopentylglycol, pentaerythritol, dipentaerythritol or sorbitol.

Possible polyhydroxy-polyethers are compounds of the formula

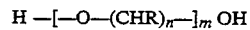

H —[—O—(CHR)$_n$—]$_m$ OH in which
R is hydrogen or a lower alkyl radical, optionally with various substituents,
n is from 2 to 6 and
m is from 10 to 120.

Examples are poly(oxytetramethylene) glycols, poly(oxyethylene) glycols and poly(oxypropylene) glycols. The preferred polyhydroxy-polyethers are poly(oxypropylene) glycols having a molecular weight in the range from 88 to 5000.

The polylactone polyols derived from lactones are obtained, for example, by reacting an ω-caprolactone with a polyol. Such products are described in U.S. Pat. No. 3,169,945.

The polylactone-polyols which are obtained by this reaction are distinguished by the presence of a terminal hydroxyl group and by recurring polyester moieties which are derived from the lactone. These recurring molecular moieties can correspond to the formula

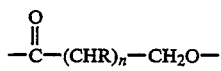

$$-\overset{O}{\underset{\|}{C}}-(CHR)_n-CH_2O-$$

in which n is preferably 4 to 6 and the substituent R is hydrogen, an alkyl radical, a cycloalkyl radical or an alkoxy radical, no substituent containing more than 12 carbon atoms.

The lactone used as the starting material can be any desired lactone or any desired combination of lactones, and this lactone should contain at least 6 carbon atoms in the ring, for example 6 to 8 carbon atoms, and 2 hydrogen substituents should be present on the carbon atom bonded to the oxygen group of the ring. The lactone used as the starting material can be represented by the following general formula:

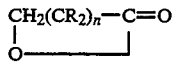

$$\underset{O\underline{\hspace{1cm}}}{\overset{CH_2(CR_2)_n-C=O}{|}}$$

in which n and R have the meaning already given.

The lactones preferred in the invention are the ε-caprolactones, in which n has the value 4. The most preferred lactone is unsubstituted ε-caprolactone, in which n has the value 4 and all the R substituents are hydrogen. This lactone is particularly preferred, since it is available in large amounts and produces coatings which have excellent properties. Various other lactones can furthermore be used individually or in combination.

Examples of aliphatic polyols which are suitable for the reaction with the lactone are ethylene glycol, propane-1,3-diol, butane-1,4-diol, hexane-1,6-diol, dimethylolcyclohexane, trimethylolpropane, pentaerythritol, 2,2-bis(4-hydroxycyclohexyl)propane or neopentylglycol.

The polycarbonate polyols or polycarbonate diols are compounds which correspond to the general formula

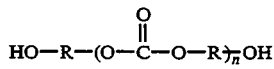

$$HO-R-(O-\overset{O}{\underset{\|}{C}}-O-R)_{\overline{n}}OH$$

where R is an alkylene radical. These OH-functional polycarbonates can be prepared by reaction of polyols, such as propane-1,3-diol, butane-1,4-diol, hexane-1,6-diol, diethylene glycol, triethylene glycol, 1,4-bishydroxymethylcyclohexane, 2,2-bis(4-hydroxycyclohexyl)propane, neopentylglycol, trimethylolpropane, pentaerythritol, with dicarbonates, such as di/nethyl, diethyl or diphenyl carbonate, or phosgene. Mixtures of such polyols can likewise be employed.

The following compounds may be mentioned as examples of ionic monomers having sulfo groups: sulfophthalic acid, sulfoterephthalic acid, sulfoisophthalic acid, dimethyl sulfoisophthalate, 1-hydroxy-3-sulfo-6-aminonaphthalene (gamma acids), 1,3-phenylenediamine-4-sulfonic acid, 1-amino-8-naphthol-4-sulfonic acid, chromotropic acid, 4,4'-diaminostilbene-2,2'-disulfonic acid, 2,3-dihydroxynaphthalene-6-sulfonic acid, 3-hydroxy-2-hydroxymethylpropanesulfonic acid and 1,4-dihydroxybutanesulfonic acid.

Examples of ionic monomers having a carboxyl group are α-$C_2$–$C_{10}$-bishydroxycarboxylic acids, such as, for example, dihydroxypropionic acid, dimethylolpropionic acid, dihydroxyethylpropionic acid, dimethylolbutyric acid, dihydroxysuccinic acid, dihydroxymaleic acid and dihydroxybenzoic acid. The sulfo and carboxyl groups in these monomers may also be present in the form of their alkali metal salts, such as lithium, sodium or potassium salts, or amine salts.

These monomers can be neutralized before the reaction with a tertiary amine, such as, for example, trimethylamine, triethylamine, dimethylaniline, diethylaniline or triphenylamine, or with an alkali metal hydroxide, in order to avoid reaction of the acid group with the isocyanate in the subsequent reaction of the ionic polyester, polycarbonate or polyether to give the polyurethane resin. If the probability of such a reaction is only slight, the acid groups can also be neutralized only after their incorporation into the polyesterpolyol. The neutralization is then carried out with aqueous solutions of alkali metal hydroxides or with amines, for example with trimethylamine, triethylamine, dimethylaniline, diethylaniline, triphenylamine, dimethylethanolamine, aminomethylpropanol and dimethylisopropanolamine, or with ammonia. In addition, the neutralization can also be carried out with mixtures of amines and ammonia. Mixtures of amines, ammonia and alkali metal hydroxides can also be used.

The ionic polyester polyols, polycarbonate polyols or polyether polyols thus obtained are then reacted with a polyisocyanate, preferably with a diisocyanate. Suitable polyisocyanates are all compounds of this type which are known here, for example trimethylhexamethylene diisocyanate, tetramethylene diisocyanate, pentamethylene diisocyanate, hexamethylene diisocyanate, propylene diisocyanate, ethylene diisocyanate, 1-methyltrimethylene diisocyanate, cyclopentylene 1,3-diisocyanate, cyclohexylene 1,4-diisocyanate, cyclohexylene 1,2-diisocyanate, phenylene 1,3-diisocyanate, phenylene 1,4-diisocyanate, toluylene 2,4-diisocyanate, toluylene 2,6-diisocyanate, biphenylene 4,4'-diisocyanate, naphthylene 1,5-diisocyanate, naphthylene 1,4-diisocyanate, 1-isocyanatomethyl-5-isocyanato-1,3,3-trimethylcyclohexane, bis-(4-isocyanatocyclohexyl) methane, bis-(4-isocyanatophenyl) methane, 4,4'-diisocyanatodiphenyl ether, 2,3-bis(8-isocyanatooctyl)-4-octyl-5-hexylcyclohexene, m-tetramethylxylylene diisocyanate or the o- or p-isomer thereof, isocyanurates of the above diisocyanates and allophanates of the above diisocyanates. Mixtures of such polyisocyanates may also be used.

The preparation of the polyurethanes from the ionic polyester polyols, polyether polyols and polycarbonate polyols and the polyisocyanates is carried out by the conventional methods known in urethane chemistry. Here, tertiary amines, such as, for example, triethylamine, dimethylbenzylamine, diazabicyclooctane and dialkyl-tin(IV) compounds, such as, for example, dibutyltin dilaurate, dibutyltin dichloride and dimethyltin dilaurate, can be used as catalysts. The reaction can be carried out either in the absence of a solvent in the melt or in the presence of a solvent. Suitable solvents, which can subsequently be removed by distillation are, for example, methyl ethyl ketone, methyl isobutyl ketone, acetone, tetrahydrofuran, toluene and xylene. These solvents can be distilled off completely or partially after the preparation of the polyurethane dispersion. It is also possible to use water-dilutable high-boiling solvents, for example N-methylpyrrolidone or dimethylformamide, which then remain in the dispersion.

The potentially ionic polyurethanes thus obtained are then neutralized, unless the groups in the monomers were used from the outset in neutralized form.

The neutralization is carried out with aqueous solutions of alkali metal hydroxides or with amines, for example with trimethylamine, triethylamine, dimethylaniline, diethylaniline, triphenylamine, dimethylethaniline, aminomethylpropanol, dimethylisopropanolamine, or with ammonia. In addition, the neutralization can also be carried out with mixtures of amines and ammonia.

The ratio of ionic polyester polyol, polyether polyol or polycarbonate polyol to polyisocyanate can, on the one hand, be chosen so that the ratio of the number of equivalents of OH groups to that of NCO groups is greater than 1. In this case, polyurethanes according to the invention having terminal hydroxyl groups are obtained. Polyurethanes of this type can be reacted subsequently with further polyisocyanates of the type described above, if necessary with chain extension. This reaction may take place both in the melt or in solution and, after dispersing, in the aqueous phase. The ratio of the number of equivalents of OH groups to that of NCO groups can, however, also assume values of less than 1.

In this case, polyurethanes according to the invention having free terminal isocyanate groups are obtained. Polyurethanes of this type are then reacted with alcohols or amines, which serve as chain terminators, or the molecular weight is increased (chain extension) by reaction with polyols or polyamines, preferably diols or diamines.

Suitable chain terminators are, for example, primary amines, such as propylamine, butylamine, pentylamine, 2-amino-2-methylpropanol, ethanolamine and propanolamine, secondary amines, such as diethanolamine, dibutylamine and diisopropanolamine, primary alcohols, such as methanol, ethanol, propanol, butanol, hexanol, dodecanol, stearyl alcohol, secondary alcohols, such as isopropanol and isobutanol, and the corresponding thioalcohols.

Suitable diols or diamines for chain extension are the conventional glycols, such as ethylene glycol, propylene glycol, butane-1,3-diol and butane-1,4-diol, hexanediol, neopentylglycol, cyclohexanediol, 2,2-bis(4-hydroxycyclohexyl) propane, 2,2-bis(4-hydroxyethoxyphenyl)propane, diethylene glycol or dipropylene glycol, diamines such as ethylenediamine, methylpentanediamine, hydrazine, piperazine, isophoronediamine, toluenediamine or diaminodiphenylmethane, and aminoalcohols. The chain extension may also be effected by hydrolyzing some of the free isocyanate groups in the polyurethanes according to the invention with water. The amino groups formed then react with the isocyanate groups still present, chain extension taking place.

After their synthesis, either in the melt or in an organic solvent, the polyurethanes according to the invention are converted into an aqueous dispersion by the addition of water.

If the preparation of the polyurethane resin was carried out in a solvent which can be distilled off and which either forms an azeotropic mixture with a boiling point below 100° C. or itself has a boiling point below 100° C., for example in acetone or xylene, the solvent is finally distilled off from the dispersion. Aqueous polyurethane dispersions are obtained in all cases. The acid numbers of these polyurethane dispersions are in the range from 0 to 80, particularly preferably in the range from 0 to 40, units.

In the preparation of these polyurethane dispersions, it is also possible to incorporate ionic monomers into the polyurethane block, in addition to the ionic groups in the polyester, polycarbonate and/or polyether block. This can be effected by using the ionic macrodiol together with a diol or diamine which contains sulfo, carboxyl or phosphono groups and then reacting it together with a diisocyanate. A further varient comprises subjecting the isocyanate-terminated polyurethane prepolymer to chain extension with an ionic polyamine or polyol in the organic phase (solvent varient) or in the aqueous phase. The possibilities of the synthesis in principle, as described above, are not affected by the introduction of these additional ionic monomers into the polyurethane block.

Owing to their chemical composition, the polyurethane dispersions according to the invention are suitable for diverse uses, for example for the preparation of coating systems, inter alia for coating wood, as binders for water-dilutable adhesives or as resins for printing inks. The polyurethane dispersions according to the invention are also very suitable for use as fillers in a multi-coat system.

They can be combined with and are in general compatible with other aqueous dispersions and solutions of plastics, for example acrylic and/or methacrylic polymers, polyurethane resins, polyurea resins, polyester resins and epoxy resins, thermoplastics based on polyvinyl acetate, -vinyl chloride, -vinyl ether, -chloroprene and -acrylonitrile and ethylene/butadiene/styrene copolymers. They can also be combined with substances which have a thickening action and are based on polyacrylates or polyurethanes containing carboxyl groups, hydroxyethylcellulose, polyvinyl alcohols and inorganic thixotropic agents, such as bentonite, sodium/magnesium silicates and sodium/magnesium/fluorine/lithium silicates.

The polyurethane dispersions according to the invention can be applied to the most diverse substrates, for example ceramic, wood, glass, concrete and preferably plastics, such as polycarbonate, polystyrene, polyvinyl chloride, polyester, poly(meth)acrylates, acrylonitrile/butadiene/styrene polymers and the like, and preferably to metal, such as iron, copper, aluminum, steel, brass, bronze, tin, zinc, titanium, magnesium and the like. They adhere to the various substrates without adhesion-promoting primers or intermediate layers.

The polyurethane dispersions according to the invention are suitable, for example, for the production of anticorrosion coatings and/or intermediate coatings for the most diverse fields of use, in particular for the production of metallic and plain base coats in multi-coat paint systems for the fields of automotive and plastics coating, and for producing primer coats for the field of plastics coating.

When used as fillers, polyurethane dispersions according to the invention are distinguished by improved stone chip resistance and good intermediate adhesion. In addition, they have good elongation at break, good adhesion of intermediate coatings and excellent impact strength. The resistance to atmospheric humidity and solvents is also very good.

Owing to the short flush-off times of the base coats based on the polyurethane dispersions according to the invention, the pigmented base coat can be over-coated with a clear coat without a baking step (wet-on-wet process) and the coatings can then be baked together or subjected to forced drying. Base coats prepared with the polyurethane dispersions according to the invention give paint films of the same quality largely independently of the baking or drying temperature, so that they can be employed both as a repair paint for motor vehicles and as a baking enamel for series coating of motor vehicles. In both cases, paint films having a good adhesion to the original coating and a good resistance to condensation water result. The brilliance of the paint coating after a condensation water test is furthermore not noticeably impaired.

The crosslinking agents customary in the paint industry, such as, for example, water-soluble or -emulsifiable melamine or benzoguans/nine resins, water-emulsifiable polyisocyanates or water-emulsifiable prepolymers having terminal isocyanate groups, water-soluble or -dispersible polyaziridines and blocked polyisocyanates, can be added during formulation of water-dilutable paints using the polyurethane dispersions according to the invention. The aqueous coating systems can contain all the inorganic or organic pigments and dyestuffs which are known and are customary in paint technology, as well as wetting agents, foam suppressants, flow control agents, stabilizers, catalysts, fillers, plasticizers and solvents.

The polyurethane dispersions according to the invention can also be used directly for the adhesive bonding of any substrates, for example in the form of adhesive sticks, wood adhesives or household adhesives. To achieve specific adhesive properties, the polyurethane dispersions according to the invention can be mixed with other dispersions or solutions of plastics (see above). Crosslinking agents, such as, for example, water-emulsifying polyisocyanates, which may also be completely or partially blocked, or water-emulsifiable prepolymers having terminal isocyanate groups or water-soluble or -emulsifiable melamine or benzoguanamine resins, can furthermore be added to improve the heat distortion resistance and peel strength.

The adhesives based on the polyurethane dispersions according to the invention can contain the additives customary in adhesives technology, such as plasticizers, solvents, film-binding auxiliaries, fillers and synthetic and naturally occurring resins. They are specifically suitable for the production of adhesive bonds with substrates in the motor vehicle industry, for example bonding of interior finishings, and in the shoe industry, for example for bonding the shoe sole and shoe shaft. The adhesives based on the polyurethane dispersions according to the invention are prepared and processed by the customary methods of adhesives technology used for aqueous dispersion and solution adhesives.

EXAMPLES

Preparation of a Polyester Having Sulfonate Groups 543.2 g of the sodium salt of dimethyl 5-sulfoisophthalate are added to 4.5 kg of a polyester prepared from hexane-1,6-diol and adipic acid (OH number: 130) and the mixture is heated with 10 g of butyl titanate to 220° C., the methanol formed being distilled off. A hydroxyl-terminated polyester containing sulfonate groups and having an OH number of 77 mg KOH/g is formed.

Preparation of a polyester having sulfonate groups 2726 g of hexane-1,6-diol, 2529 g of adipic acid and 559.1 g of the sodium salt of dimethyl 5-sulfoisophthalate are initially taken and the temperature is increased slowly to 220° C. The water/methanol mixture formed is distilled off. A hydroxyl-terminated polyester containing sulfonate groups and having an OH number of 77 mg KOH/g is obtained.

By using different amounts of diol, carboxylic acid and sulfonic acid, polyesters having different OH numbers and different contents of water-soluble groups can be prepared in an analogous manner. The following examples illustrate the preparation of polyurethane dispersions based on such polyesters having sulfonate groups.

Preparation of a Polyurethane Dispersion Having Sulfonate Groups 54.6 g of toluene diisocyanate are metered into 284.3 g of a sulfoisophthalate-containing poly(hexanediol adipate) (OH number 54) and 16.5 g of ethylene glycol at 130° C., and the reaction is carried out to an NCO value of 0. Thereafter, 39.2 g of tetramethylxylylene diisocyanate are metered in at the same temperature and the reaction is carried out to an NCO content of 1.53%. Dispersion is effected with 521 g of hot demineralized water and, immediately thereafter, a solution of 8.3 g of methylpentane-1,5-diamine in 83.4 g of demineralized water is metered in. Stirring is carried out for 1 hour at 80° C., after which the ready-prepared polyurethane dispersion is obtained.

By varying the count of the three starting components, an OH-terminated polyurethane can also be prepared in an analogous manner and can be further used directly in this form.

Preparation of a Polyurethane Dispersion Having Sulfonate Groups 99.1 g of tetramethylxylylene diisocyanate are metered into 284.3 g of a sulfoisophthalate-containing poly(hexanediol adipate) (OH number 61 mg KOH/g) and 11.2 g of ethylene glycol at 130° C. and the reaction is carried out to an NCO value of 1.53%. 15.1 g of diethanolamine are rapidly added and the reaction is carried out to an NCO value of 0%. After dispersing with 600 g of demineralized, hot water, a ready-prepared dispersion is obtained.

Preparation of a Polyester Having Carboxyl Groups 2242 g of adipic acid and 2572 g of hexane-1,6-diol are slowly heated to 220° C. while distilling off the resulting water, and the reaction is carried out until an acid number of 0 mg KOH/g has been reached. After cooling, 536.5 g of adipic acid and 334.7 g of dimethylolpropionic acid are added, the mixture is heated again to 220° C. and distillation is carried out until an acid number of 28 mg KOH/g and an OH number of 130 mg KOH/g have been reached.

Preparation of a Polyester Dispersion Having Carboxyl Groups 320 g of a dimethylolpropionic acid-containing poly(hexanediol adipate) (acid number: 28, OH number: 130) and 2.8 g of ethylene glycol are dissolved in 440 g of acetone and are reacted at 50° C. with 121.4 g of tetramethylxylylene diisocyanate until an NCO value of 0.77% has been reached. After neutralization with 12.9 g of triethylamine and dispersing with 586 g of demineralized water, a solution of 9.4 g of methylpentanediamine and 94 g of demineralized water is immediately added. The acetone is distilled off and the water lost is replaced.

We claim:

1. A polyurethane dispersion obtained by reacting at least one member of the group consisting of polyester polyols containing ionic groups, polycarbonate polyols containing ionic groups and polyether polyols containing ionic groups with at least one polyisocyanate.

2. A polyurethane dispersion as claimed in claim 1, wherein the ratio of the number of equivalents of OH groups of the ionic polyester polyol, polycarbonate polyol or polyether polyol to that of the NCO groups of the polyisocyanate is greater than 1.

3. A polyurethane dispersion obtained by reacting an ionic polyester polyol, polycarbonate polyol or polyether polyol with a polyisocyanate, the ratio of the number of equivalents of OH groups of the polyol to that of the NCO groups of the polyisocyanate being less than 1, and subsequent reaction with an alcohol or amine.

4. A polyurethane dispersion obtained by reacting an ionic polyester polyol, polycarbonate polyol or polyether polyol with a polyisocyanate, the ratio of the number of equivalents of OH groups of the polyol to that of the NCO groups of the polyisocyanate being less than 1, and subsequent chain extension by reaction with polyols or polyamines or by partial hydrolysis.

5. A polyurethane dispersion obtained by reaction of an ionic polyester polyol, polycarbonate polyol or polyether polyol with a polyisocyanate, the ratio of the number of equivalents of OH groups of the polyol to that of the NCO groups of the polyisocyanate being greater than 1, and subsequent reaction with a further polyisocyanate.

6. A coating containing as a binder a polyurethane dispersion of claim 1.

7. An adhesive containing as a binder a polyurethane dispersion of claim 1.

8. A printing ink containing as a binder a polyurethane dispersion of claim 1.

* * * * *